United States Patent [19]
Crosley et al.

[11] 3,919,504
[45] Nov. 11, 1975

[54] METHOD AND APPARATUS ON IN-CIRCUIT TESTING OF A GROUP OF SEQUENTIALLY-OPERATED SYSTEM OUTPUT BISTABLE DEVICES

[75] Inventors: Thomas W. Crosley, Northlake, Ill.; Howard R. Miller, College Station, Tex.

[73] Assignee: GTE Automatic Electric Laboratories Incorporated, Northlake, Ill.

[22] Filed: Feb. 27, 1974

[21] Appl. No.: 446,575

[52] U.S. Cl. .................. 179/175.2 R; 324/28 R
[51] Int. Cl.² .................................... H04M 3/26
[58] Field of Search .......... 179/175.2 R, 175.23; 340/172.5; 324/28 R, 28 SE

[56] References Cited
UNITED STATES PATENTS

| | | | |
|---|---|---|---|
| 3,299,220 | 1/1967 | Wedmore | 179/175.2 R |
| 3,400,229 | 9/1968 | Vande Wege | 179/175.2 R |
| 3,555,410 | 1/1971 | Basu | 324/28 SE |

*Primary Examiner*—Kathleen H. Claffy
*Assistant Examiner*—Douglas W. Olms

[57] ABSTRACT

A method and apparatus of in-circuit testing of bi-stable devices in a system having a sequentially-operated control unit including a sequence state counter for setting and resetting the bi-stable devices, includes advancing the sequence state counter to a sequence state associated with the selected device under test, enabling sequentially the selected device under test to be controlled by the output of the counter, providing a processing unit for determining the proper output condition of the selected device under test and selectively gating subsequently the output of the selected bi-stable device under test to the processing unit to determine whether or not the device under test is operative.

2 Claims, 12 Drawing Figures

FIG. 12 WORK AREA OVERLAY MWL PARTIAL DEFINITION - DEFINES BUFFER FOR MRAI (INPUT REG.); WORDS 32-37

METHOD AND APPARATUS ON IN-CIRCUIT TESTING OF A GROUP OF SEQUENTIALLY-OPERATED SYSTEM OUTPUT BISTABLE DEVICES

BACKGROUND OF THE INVENTION

1. Field of the Invention

The present invention relates to a method and apparatus of in-circuit testing of a large group of sequentially-operated bi-stable devices, such as latches, in a system having a sequentially-operated control unit for setting and resetting the bi-stable devices.

2. Description of the Prior Art

Electronic systems, such as electronic telephone switching systems, oftentimes include sequencing control units employing sequence state counters to control a series of operations in the system. Bi-stable devices, such as latches, are set and reset by the sequence state counter to control in turn other circuits and sub-systems of the communication switching system. It would be highly desirable to have a technique for testing the bi-stable devices for the purpose of determining whether or not they are operating properly. However, in order to test a large number of such bi-stable devices in the case where the system requires a large number of sequence states for performing the various different system operations, such a testing technique should be efficient and economical in operation. In this regard, it would not be desirable to add additional testing circuits for each one of the bi-stable devices, since the testing circuits themselves may malfunction and the extra expense could not be justified in the case of a large number of bi-stable devices to be tested. Thus, a technique for testing the bi-stable devices in an efficient and economical manner would be highly desirable, and such testing procedures should be performed while the bi-stable devices are in circuit, that is, while they are connected in the system and other circuits of the system are used to activate the bi-stable devices under test and to detect the responses thereof for test purposes.

SUMMARY OF THE INVENTION

Therefore, the principal object of the present invention is to provide a new and improved method and apparatus for in-circuit testing of a large number of bi-stable devices in a system having a sequentially-operated control unit in an efficient and economical manner.

Briefly, the above and further objects are realized in accordance with the present invention by advancing the sequence state counter of the sequentially-operated control system unit to a sequence state associated with the selected bi-stable device under test, enabling subsequently the selected device under test to be controlled by the output of the counter, and selectively gating subsequently the output of the selected bi-stable device under test to a processor to determine whether or not the device under test is operative.

CROSS-REFERENCES TO RELATED APPLICATIONS

The preferred embodiments of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. patent application Ser. No. 130,133 filed Apr. 1, 1971 by K. E. Prescher, R. E. Schauer and F. B. Sikorski, now abandoned and a continuation-in-part thereof Ser. No. 342,323 filed Mar. 19, 1973, now U.S. Pat. No. 3,835,260, issued Sept. 10, 1974, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480 filed May 3, 1971 now U.S. Pat. No. 3,729,715 issued May 31, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851 filed Nov. 24, 1971 now U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in U.S. patent application filed July 12, 1972, Ser. No. 270,909 now U.S. Pat. No. 3,784,801 issued Jan. 8, 1974 by J. P. Caputo and F. A. Weber for a DATA HANDLING SYSTEM ERROR AND FAULT DETECTING AND DISCRIMINATING MAINTENANCE ARRANGEMENT, this application being referred to hereinafter as the REGISTER-SENDER MAINTENANCE patent application.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and also in U.S. patent applications Ser. No. 281,586 filed Aug. 17, 1972 now U.S. Pat. No. 3,806,659 issued Apr. 23, 1974 by J. W. Eddy for an INTERLOCK ARRANGEMENT FOR A COMMUNICATION SWITCHING SYSTEM, Ser. No. 311,606 filed Dec. 4, 1972 now U.S. Pat. No. 3,830,983 issued Aug. 30, 1974 by J. W. Eddy and S. E. Puccini for a COMMUNICATION SYSTEM CONTROL TRANSFER ARRANGEMENT, Ser. No. 303,157 filed Nov. 2, 1972 now U.S. Pat. No. 3,809,822 issued May 7, 1974 by J. W. Eddy and S. E. Puccini for a COMMUNICATION SWITCHING SYSTEM INTERLOCK ARRANGEMENT, hereinafter referred to as the MARKER patents.

The communication register and the marker transceivers are described in U.S. patent application Ser. No. 320,412 filed Jan. 2, 1973 now U.S. Pat. No. 3,814,858 issued June 4, 1974 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATION REGISTER patent application.

The executive program for the data processor unit is disclosed in U.S. patent application Ser. No. 347,281, filed Apr. 2, 1973 by C. A. Kalat, E. F. Wodker, A. W. Clay and P. R. Harrington for a STORED PROGRAM CONTROL IN A COMMUNICATION SWITCHING SYSTEM, hereinafter referred to as the EXECUTIVE PROGRAM patent application.

The computer third party circuit is disclosed in U.S. patent application Ser. No. 348,575, filed Apr. 6, 1973 for a "DATA PROCESSOR SYSTEM DIAGNOSTIC ARRANGEMENT" by L. V. Jones et al, hereinafter referred to as the THIRD PARTY patent application. The data processor system localization program is disclosed in U.S. patent application Ser. No. 348,541, filed Apr. 6, 1973 for a "METHOD OF LOCALIZING THE CAUSES OF MALFUNCTIONS OCCURRING IN A DATA PROCESSOR SYSTEM" by P. J. Keehn, R. C. Wegner, D. C. Robbins, D. Chang, W. K. Yuan and J. L. Clements, hereinafter referred to as the COMPUTER LOCALIZATION PROGRAM patent application.

The automatic test system for the system is disclosed in the following U.S. patent applications: L. J. Lensy et al application Ser. No. 370,576, filed June 15, 1973 T. W. Crosley and H. R. Miller and L. J. Putchinski application Ser. No. 446,574; filed Feb. 27, 1974:

DESCRIPTION OF THE PREFERRED EMBODIMENT

Figure 1:
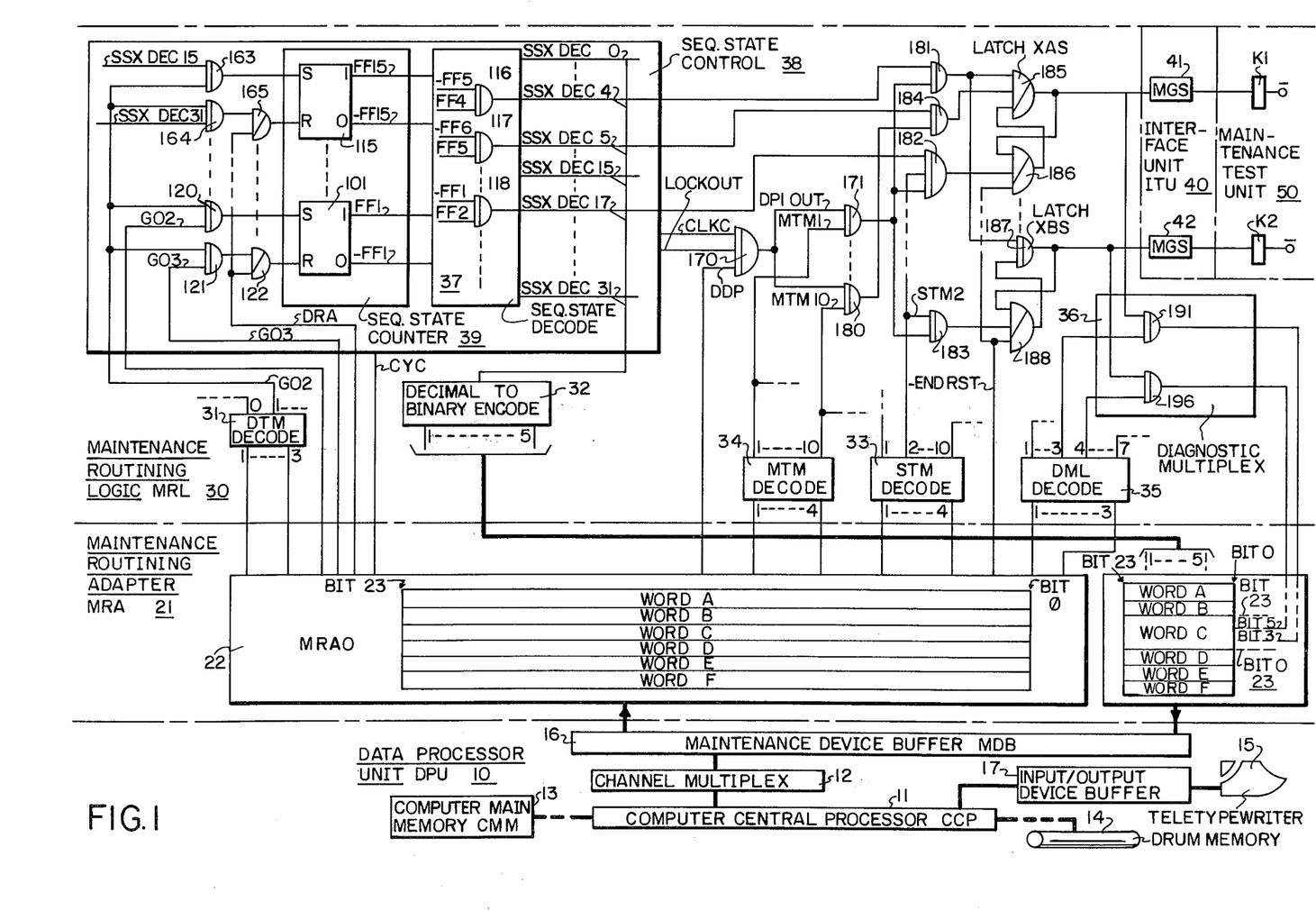
FIG. 1 is a symbolic functional block diagram of a system incorporating the principles of the present invention.

Referring now to the drawings, and more particularly to FIG. 1 thereof, there is shown a communication switching system including a data processing unit 10 which functions as the central coordinating unit and communication hub for the system, as more fully disclosed in the above-cited patents and patent applications. The communication switching system as disclosed in the above-cited patents and applications and as incorporating the principles of the present invention is an electronic telephone system, only a portion of which is shown in FIG. 1 for the purposes of this invention. A central processor CCP 11 is the central control unit of the unit 10 and is used to obtain program instructions stored in a computer main memory (CMM) 13, to interpret each instruction, and to perform the necessary operations specified by the instruction. The CMM 13 memory stores the system control program, referred to as the system executive program as well as those application programs whose frequency of usage requires that they be locally available. A drum memory system 14 provides mass storage for translation data, diagnostic programs, tables, etc. An input/output device buffer 17 provides the central processor with serial and/or parallel information concerning its associated teletypewriter device 15. Associated with the data processor, but as a separate equipment group, is the automatic test system ATS, which serves as a centralized facility for interfacing between the maintenance personnel, known as the "office craftsman" and the communication switching system and is the focal point for initiating test call routines and test programs, providing print-out of maintenance information, and provides special test equipment that are used in automatic testing in the exchange area. This equipment is used to test the trunks residing in the local office and testing of the customer's lines served by an office located beyond the supervisory limits of the local test trunks in the main office.

The maintenance device buffer MDB 16 acts as an interface circuit between the computer central processor 11 and the automatic test system to provide a buffer for temporary storage and to control the transfer of data. The maintenance routing adapter MRA 21 temporarily stores test instructions and test results, and transfers test instructions to the maintenance routining logic 30, and initiates the process by which test results are transferred to the computer central processor. On command for the CCP 11, the MDB 16 loads test instructions into the maintenance routining adapter output register MRAO22, which in turn transfers the instructions to the maintenance routining logic MRL 30 and then waits for the test results. When the MRL 30 is ready with the results of the tests, it stores them in the maintenance routining adapter input register MRAI 23. Both the MRAO 22 and the MRAI 23 each consist of six computer word storage areas, each word having 24 bits. By way of its direct connection with the CCP, the MRA adapter 21 sends an interrupt to the processor to initiate input data transfer. The maintenance routining logic 30 serves as the control center of the automatic test system, only a portion of which is disclosed herein. The MRL unit includes the sequencing and timing circuits for performing automatic tests on spaced-divided system equipment, such as register junctors, originating junctors and other such units. The various different types and kinds of spaced-divided system equipment and tests for the same are disclosed in the above-cited automatic test system patent applications. The unit MRL contains the interface equipment for controlling the test devices in the maintenance test unit 50 and the STO, STI, LTI and TTI circuits (not shown) seize and hold logic circuits (not shown). The MRL unit communicates with the processor CCP via the MRA adapter, and to the switching network via the MTU unit and controlled by the interface test unit 40, which provides the necessary buffer between the electronic circuitry of the MRL unit 30 and the electromechanical logic circuits of the MTU unit 50. The maintenance test unit 50 contains the test equipment and test interface circuitry for the automatic test system. The MTU unit includes the sensing and measuring devices used for performing different types of automatic tests.

A large number of output bi-stable latches, such as the latch XAS comprising OR gates 185 and 186 and the latch XBS comprising OR gates 187 and 188, serve as output devices for the unit 30, which is a sequential machine operable during a series of sequence states and causing the setting and resetting of the output latches during different ones of the sequence states. The output latches of the maintenance routining logic unit 30 operate main ground switches, such as switches 41 and 42 in the interface unit ITU 40 from switch driver SD gates 189 and 190 respectively. The MGS switches activate various circuits needed to generate and receive the signals used to routine the space divided equipment (not shown herein), such as originating junctors, register junctors, lines and others, and also to simulate other conditions necessary to complete a test, such as providing the proper interface to interact with other system units, such as the system network markers (not shown herein) during path setup. Each output latch has numerous set and reset conditions based on combinations of the output of sequence state counter decode 37 response to the state of a sequence state counter 39, of the output of MTM decode 34 indicating a main test mode having a range 1–10 and specifying the kind of space divided equipment to be tested — register junctor, originating junctor or other and of the output of a STM decode 33 indicating sub-test mode having a range 1–15 and specifying the type of the test to be made — coin stuck test, lock-out test, etc. for a coin originating junctor and other tests for other space-divided equipment. The sequence state SSX normal range is 0–31 and each state represents a test progression indication and control. The set or reset conditions of the latches are displayed to the processor CPU via one of 24 bits in one of seven words in a diagnostic multiplex circuit 36 of the maintenance routining logic 30. The normal operation of the MRL unit has been disclosed in more detail in the following patents Ser. No. 348,806, filed Apr. 6, 1973 and now U.S. Pat. No. 3,812,337 issued May 21, 1974, for the sequential control scheme with fault detection and in the above-cited patent application Ser. No. 370,560, filed June 5, 1973 and now U.S. Pat. No. 3,851,120 issued Nov. 26, 1974, for the hardware timer/scanner.

Referring now to FIG. 1 and considering the method and apparatus of the present invention in greater detail, word C storage area of the MRAI register 23 is used to retrieve up to seven 24 bit words of information from the MRL unit 30 through the diagnostic multiplex 36, which is controlled by the DML decode 35 in word storage area A of the MRAO 22 register, the other word storage areas of the register 23 being used for other purposes not relevant to the present invention. The diagnostic multiplex circuit 36 enables information about the output latches under test, with only latches XAS and XBS shown in the drawings, which latches are controlled by the main test mode MTM decode 34 and the sub-test mode STM decode 33, both of which decode instructions received from the processor CCP and temporarily stored in word storage area A of the MRAO register. Only latches CAS and XBS are shown as being representative of a large number of output latches which are controlled by the counter 39. The setting and resetting of the latches are controlled by the sequence state of the counter 39 through the sequence state decode circuit 37, which in turn decodes the state of 15 flip flops 101 through 115 of the counter 39, and are controlled by the DTM logic decode 31 in word storage area E of the MRAO register 22 and three other bits that are temporarily stored in word storage areas A and F of the MRAO register. The diagnostic information in the form of a 24 bit word temporarily stored in word area C of register MRAI is transferred to the processor CCP for analyzing the conditions of the latches under test.

In operation, the MRL unit 30 is initialized to the MTM and STM decoded instructions specified in the MRAO 22 register as received from the system central processor for the purpose of determining which latches to set or reset at the proper sequence state. The MTM decode 34 enables a set of the ten gates 171 through 180, which in turn enable gates 181 through 184 with the combining of the outputs of gates 170 and 171 in response to one of the ten output leads from the STM decode 33, the gates 171–180 being enabled by the MTM decode 34 and the gate 170. The MRL unit is then advanced sequentially to the proper sequence state in response to instructions from the central processor CCP through the DTM logic decode 31 and leads G02, G03 and DRA from the processor via the register 22 to AND gates 120 through 165, which in turn enable the flip flops 101 through 115 of the counter 39 to advance and to count to the desired sequence state corresponding to the latches XAS and XBS under test. The desired state is then detected by the sequence state decode 37 circuit, which in turn is combined with the MTM and STM decodes to enable gates 181 through 184 for providing setting and resetting signals for the two latches XAS and XBS under test. While two latches are shown and described, it is to be understood that any number of latches may be employed in accordance with the present invention. The diagnostic multiplex 36 is then enabled by the DML decode 35, which is supplied with sufficient multiplex information from the central processor for the purpose of gating one of seven rows of 24 bi-stable devices to the word storage area C of the MRIO 23 register for storage therein. Only the outputs of the latches under test (latches XAS and XBS in the present example) are utilized by the processor and the remaining bits of the 24 are not utilized. The DML decode 35 enables leads ROW 1 through ROW 7 to open a large group of diagnostic multiplex 36 gates, of which only gates 191 and 196 are shown and described for the purposes of the present invention. In this manner the central processor receives the status of 24 bi-stable devices through the maintenance device buffer 16 and can compare this information to the expected value for these devices. After examining one of the latches, the processor advances the counter 39 to a state corresponding to the next one of the latches under test. Thereafter the operation is repeated for all latches under test.

Considering now the method and apparatus of the present invention in greater detail, the AND gate 191 has its output connected to the first position, bit 0, of the MRAI register and has one of its inputs connected to the output of XAS latch OR gate 185, the other input being connected to the output lead ROW 3 of the DML decode 35 circuit. The AND gate 196 has its output connected to the sixth position, bit 5, of the MRAI register and has one of its inputs connected to the output of the XBS latch OR gate 187, the other input being connected to the output lead ROW 4 of the DML decode 35 circuit. The MGS device 41 has its output connected to relay coil K1 and has its input connected to the output of the OR gate 185. The MGS device 42 has its output connected to relay coil K2 and has its input connected to the output of the OR gate 187. The main ground switch relay drivers illustrated in the drawing and designated MGS are electronic switches to operate relays, and they may comprise two transistors connected so that when a true signal is supplied at the input, ground potential from the main ground switch is connected via the emitter-collector path of the output state in saturation to a relay. The OR gate 185, part of latch XAS, has its output connected to the input of MGS device 41, the input of AND gate 191 and the input of OR gate 186, and has one of its inputs connected to the output of AND gate 181, another input being connected to the output of AND gate 181, another input being connected to the output of AND gate 184, and the last input being connected to the output of XAS latch OR gate 186. The OR gate 186 has its output connected to the input of XAS latch OR gate 185 and has one of its inputs connected to the output of OR gate 185, another input is connected to the output of AND gate 182, and its final input is connected to the lead -END RST from the MRAO register. The OR gate 187, part of latch XBS, has its output connected to the input of MGS device 42, the input of AND gate 196 and the input of OR gate 188, and has one of its inputs connected to the output of AND gate 181 and its other input connected to the output of OR gate 188. Latch XBS OR gate 188 has its output connected to the input of OR gate 187 and one of its inputs connected to the output of OR gate 187, another input connected to the output of OR gate 183 and its final input is connected to the lead -END RST from the MRAO register.

The AND gate 181 has its output connected to the input of OR gate 185 and the input of OR gate 187 and one of its inputs connected to lead SSX DEC 4 of the output of AND gate 116 in the sequence state control circuit 38 and the other input connected to the output of AND gate 171. The AND gate 184 has its output connected to the input of OR gate 185 and one of its inputs connected to lead SSX DEC 5 of the output of AND gate 117 in the sequence state control circuit 38 and the other input connected to the output of AND gate 180. The AND gate 183 has its output connected to the input of OR gate 186 and one of its inputs connected to lead SSX DEC 17 of the output of AND gate 118 in the sequence state control circuit, another input is connected to lead STM 2 of the sub-test mode STM decode circuit 33, and the last input is connected to the output of AND gate 171. The AND gate 183 has its output connected to the second input of OR gate 188, and one of its inputs connected to lead STM 2 of the STM decode 33 and its other input is connected to the output of AND gate 171. The AND gate 171 has its output connected to the inputs of AND gates 181, 182 and 183, and one of its inputs is connected to the output of AND gate 170 and the other input is connected to the lead MTM 1 of the main test mode MTM decode 34 circuit. The AND gate 180 has its output connected to the input of AND gate 184, and one of its inputs is connected to the output of AND gate 170 and the other input is connected to the lead MTM 10 of the MTM decode circuit 34. The AND gate 170 has its output connected to the inputs of AND gates 171 and 180, and has one of its inputs connected to lead CLK C of the sequence state control 38 circuit, another input being connected to the lead LOCKOUT from the sequence state control circuit and the last input connected to lead DDP from the output of the fourth bit position of word F in the MRAO register 22.

The sequence state counter 39, as implemented in the MRL 30, is a 16 bit, 32 state walking gray code WGC counter. The FFX and -FFX outputs of each of the flip flops are decoded into decimal as shown in the sequence state decode circuit 37. For example, sequence state 1 SSX1 in walking gray code WGC is 000 - - - 001, SSX2 is 000 - - - 011, SSX1G is 111 - - - 111, SSX17 is 111 - - - 110 and SSX31 is 100 - - - 000. The decimal decodes are used to control the setting and resetting of the bi-stable devices. The diagnostic test mode DTM decode 31 controls the advancing of the sequence state counter 39 up to a required sequence state SSX independent of the normal advance logic. This mode of operation is more fully described in the U.S. Pat. No. 3,812,337 issued May 2, 1974. The AND gate 163 has its output connected to the S input of sequence state counter 39 flip flop 115, and one of its inputs is connected to lead SSX DEC 15 from the sequence state decode 37 and the other input is connected to lead DTM DEC 1 from the DTM decode circuit 31. The OR gate 165 has its output connected to the R input of sequence counter 39 flip flop 115, and one of its inputs is connected to the output of AND gate 164 and its other input is connected to lead-DRA from the fifth position, bit 4, of word F in the MRAO register 22. The AND gate 164 has its output connected to the input of OR gate 165, and one of its inputs is connected to lead DTM DEC 1 from the DTM decode circuit 31 and the other input is connected to lead SSX DEC 31 from the sequence state decode 37. The AND gate 120 has its output connected to the S input of flip flop gate 101 in sequence counter 39, and one of its inputs is connected to DTM DEC 1 lead from the DTM decode circuit 31 and the other input is connected to lead G02 from the fourteenth position, but 13, of word A in the MRAO register 22. The OR gate 122 has its output connected to the R input of flip flop gate 101 in sequence counter 39, and one of its inputs is connected to lead -DRA from the fifth position of word F in the MRAO register 22 and the other input is connected to the output of AND gate 121. The AND gate 121 has its output connected to the intput of OR gate 122, and one of its inputs is connected to lead DTM DEC 1 from the DTM decode circuit 31 and the other input is connected to lead G03 from the fifteenth position, bit 14, of word A in the MRAO register 22.

HARDWARE OPERATION

Considering now a typical operation, assuming that the processor CCP under program control first issues a RESET select instruction to both the MRA adapter 21 and the MRL unit 30. This instruction clears out the MRAO register and the MRAI register, resets the MRL sequence state counter flip flops, only the first and last ones of which are shown in FIG. 1 of the drawings — flip flops 101 and 115, and resets all the output latches in the MRL unit, two of which are output latches XAS and XBS under test in the present example. Normally lead DRA, shown as an input lead to gates 122 and 165, is high, allowing advance conditions to be inputted from the regular advance logic circuits (not shown herein), but for performing the present latch check, the regular advance logic is not used and diagnostic test mode DTM of operation is utilized by DTM=1 being decoded to enable the outputs of the sequence state counter 39 to be connected to the inputs of the counter control logic, as shown by gates 163 and 164. For example, in sequence state SSX 15, walking gray code WGC 011 - - - 111 in the preferred form of the present invention, DTM decode 1 enables gate 163 when signal SSX DEC 15 becomes true to set flip flop 115 in order to advance to SSX 16, WGC 111 - - - 111. Thus for sequence states 1 through 16, logic one's are effectively shifted in from flip flop 0 through flip flop 15, while for sequence states 17 and 31, logic zero's are shifted therethrough. The initial shift is started by setting lead G02=1, which enables the set input of flip flop 101 through gate 120. In state SSX 16, lead G02 must be reset and lead G03 set to shift in a zero, as shown in gate 121 to the reset input of flip flop 101. These two G0 leads are used in place of the SSX DEC 0 and 16 signals to allow efficient control of the counter for diagnostic purposes. Distributing pulses, DP, are generated for each sequence state advance, one being shown in FIG. 1 as the output lead DP1 OUT of AND gate 170, and are used to set or to reset latches, set interrupts and other control functions. Setting lead DDP, which is an input to AND gate 170, to a logic 1 in response to processor CCP via register 22 disables the regular distributing pulse output of gate 170. Lead DP1 OUT is a 4 microsecond pulse generated 12 microseconds after a sequence state advance and is controlled by lead CLK C, which defines the time when DP1 OUT lead is true, while lead LOCKOUT insures that only one set of distributing pulses is generated for a single sequence state advance. Refer to U.S. Pat. No. 3,812,337, issued May 21, 1974, for the generation of these control signals. The DPI OUT lead is combined with the MTM signals, gates 171 through 180, which are combined with the various sequence states and STM signals, gates 181 through 184, to set and reset the latches XAS and XBS, gates 185 through 188. The sequence state counter is advanced one sequence state at a time by toggling the CYC lead to control input circuits (not shown) for the counter 39 via instructions from processor CCP and stored in word storage area E of the MRAO register.

When the sequence state counter 39 has advanced to the desired sequence state corresponding to the next output latch to be tested, the appropriate latch is set or reset during the last sequence state advance via one or more of the AND gates in the combining logic being enabled by a combination of the DPT OUT lead being true, a decoded MTM instruction, a decoded STM instruction, and a decoded SSX sequence state. The system software then instructs the MRL unit through the diagnostic multiplex DML decode circuit leads ROW 1 through ROW 7 to open the diagnostic multiplex gates, either gate 191 or gate 196 in the present example, as shown in FIG. 1, to couple the outputs of 24 latches, including either one of the latches XAS or XBS in this example, to the word C storage area of the MRAO register 23. The diagnostic multiplex can gate up to 168 bi-stable devices, 7 rows of 24 bits each, but only the least significant 16 bits are used for output latch monitoring in the preferred form of the present invention. If the latch status is as expected and if other output latches are to be examined, the counter 39 is advanced via the lead CYC under control of processor CCP until the state corresponding to the next latch to be tested is reached, and then the operation is repeated until the last required group of bi-stable devices is examined and the system software terminates this checking operation. In this manner in accordance with the present invention, only the desired output latches of the large number of output latches are checked in circuit, that is, while being connected in the system by other circuits of the system. Also, the diagnostic multiplex 36 enables only the latches under test to be monitored by the processor CCP with only a reasonable number of logic circuits forming the multiplex 36. Even though a small number of latches are monitored during each sequence state, 24 bits are transferred to the processor CCP since it is arranged to handle 24 bit words and it is programed such that it can readily determine which ones of the 24 bits represent the status of the latches under test operable during the current sequence state.

SOFTWARE PROGRAM PROCEDURES

The maintenance routining logic diagnostic program MRLDIP, V21, provides routining, localization and repair verification for the MRL bi-stable devices contained in the ATS subsystem. The output latch test starts by first clearing down the MRL unit and then retrieving the header word of the first entry from the data base. The header contains the MTM, STM and SSX information required to set or reset a latch or latches. The header also specifies the diagnostic multiplex word or words containing the status of output latches that change state for this MTM, STM, and SSX combination. For each diagnostic multiplex word specified in the header, there is an additional 24 bit word containing the expected value of the multiplex word for the entry. This makes each entry variable in size from two to eight words.

After retrieving the header, the MRL unit is initialized to the MTM and STM information specified. A subroutine is then called to advance the MRL unit to the required sequence state. The diagnostic multiplex is then enabled for each multiplex word specified in the entry header and compared to the expected value. In this manner the program is unaware of individual latches but rather whole words of the multiplex.

After checking for expected results for the current entry, the next entry is retrieved. If the MTM is the same as the previous entry and the requested SSX is greater than the previous entry, the subroutine is then called to advance to the requested SSX. For this case, the latches set for the previous entry remain true (unless this entry resets them), and thus must be shown as true in the expected state words of this entry, if the same diagnostic multiplex words are displayed. The continued propagation of the latches is required until the latch is normally reset via an MTM (STM)-DP-SSX or until the MTM information of an entry is different than the previous entry or the requested sequence state SSX is smaller than the current sequence state SSX. In accordance with the present invention, this judicial approach provides for a relatively small base required to perform the output latch test.

Figure 2:
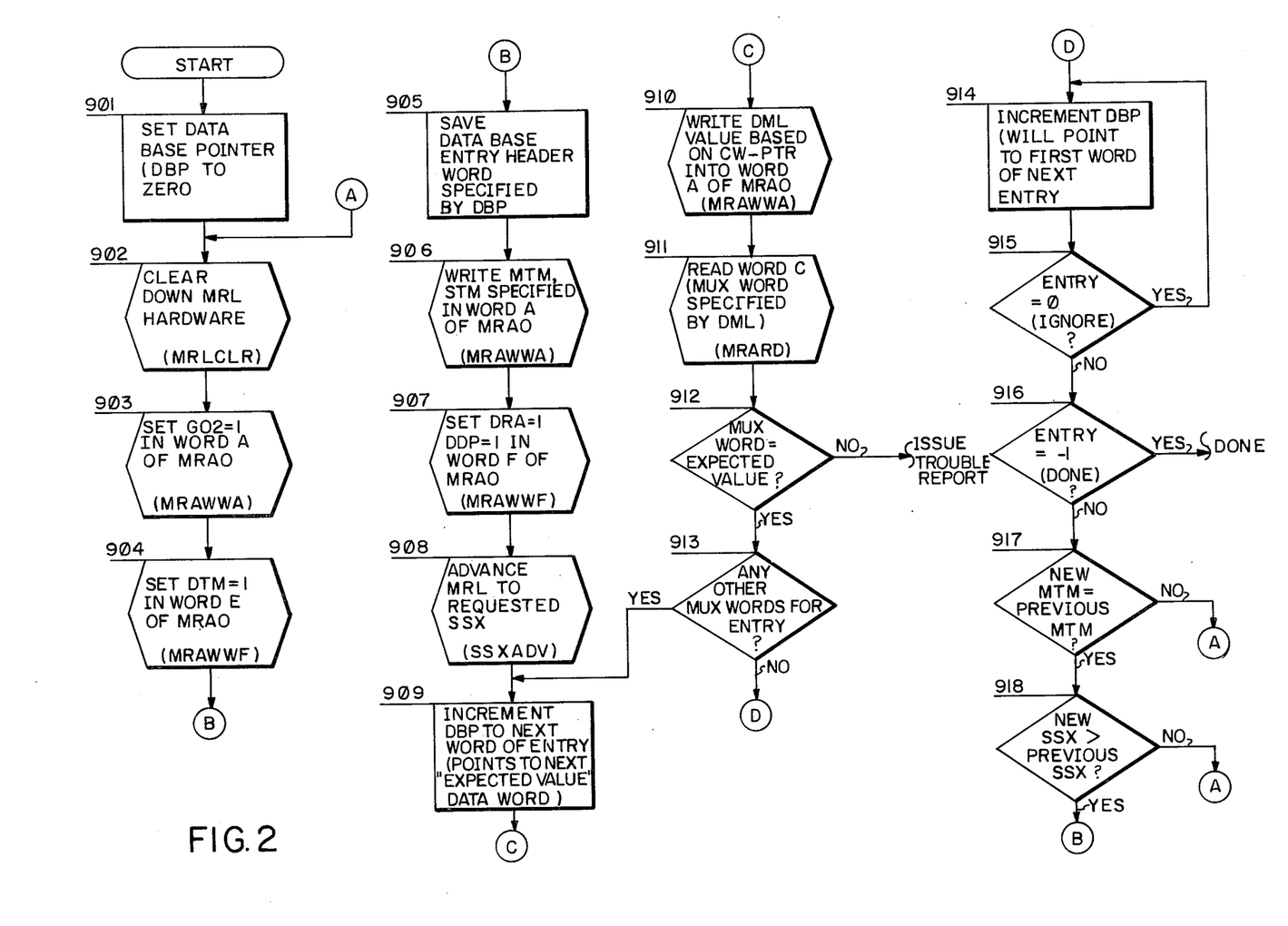
FIGS. 2–9 are flow charts of a program procedure for controlling the method and apparatus of the present invention.
Figure 4:
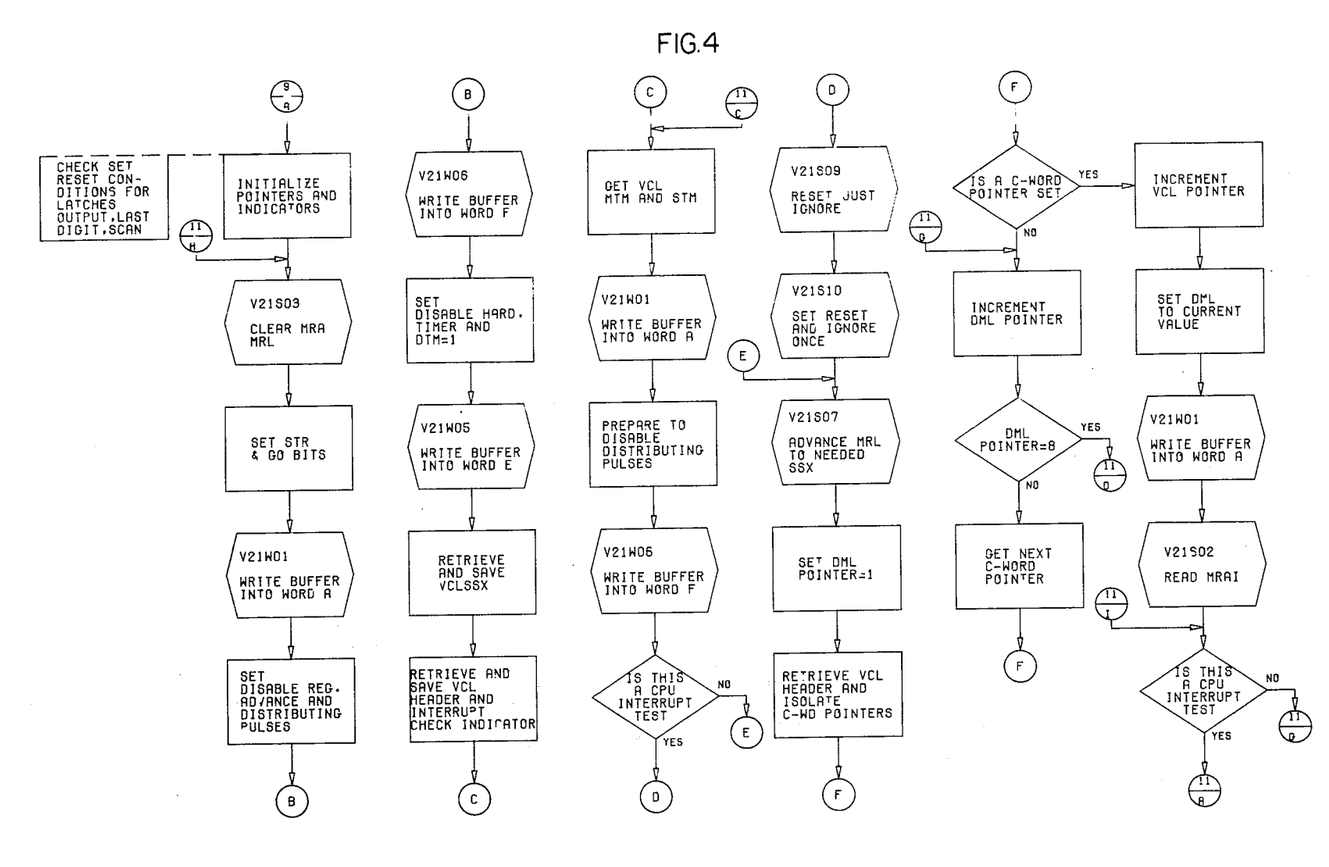
Figure 5:
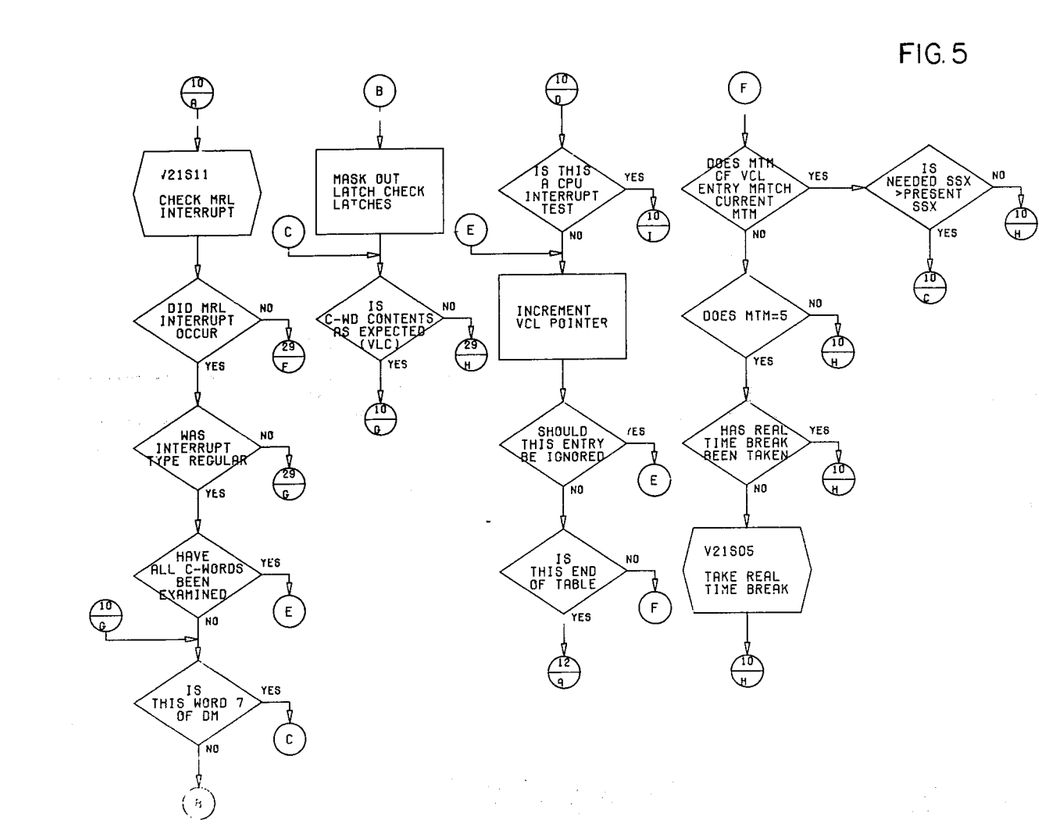

If the next entry has a different MTM information or a sequence state SSX lower than the previous entry, the MRL unit is completely cleared down and the same procedure is followed as with the first entry. If the next entry retrieved is set to zero, the program ignores the entry and moves to the next entry. This allows for easy removal of an entry. The entire process is terminated whenever the program encounters a header set to minus one. FIG. 2 is a general flow chart of the generic program used to perform the output logic test. The diagram of FIG. 2 corresponds to FIGS. 4 and 5 of the drawings.

Figure 3:
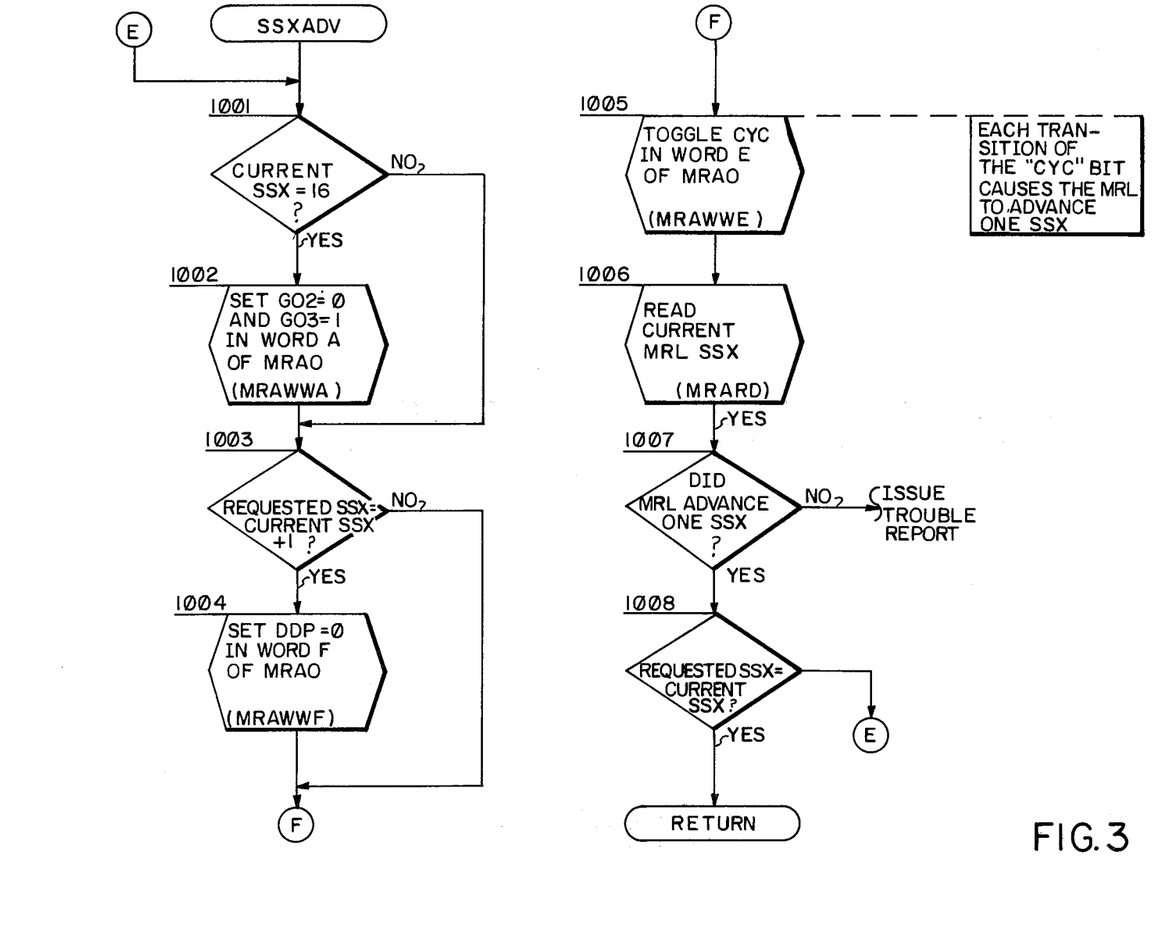
Figure 6:
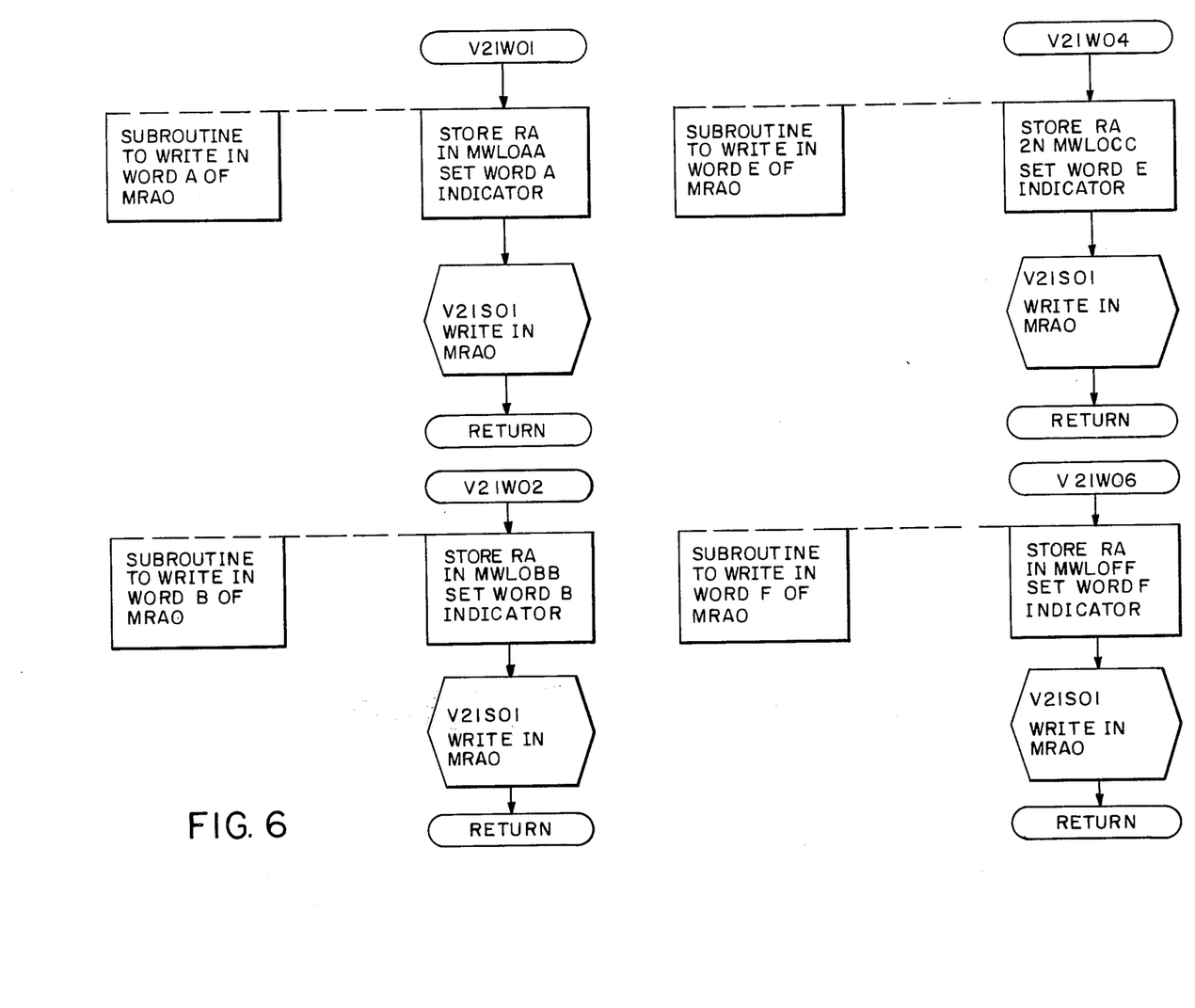
Figure 7:
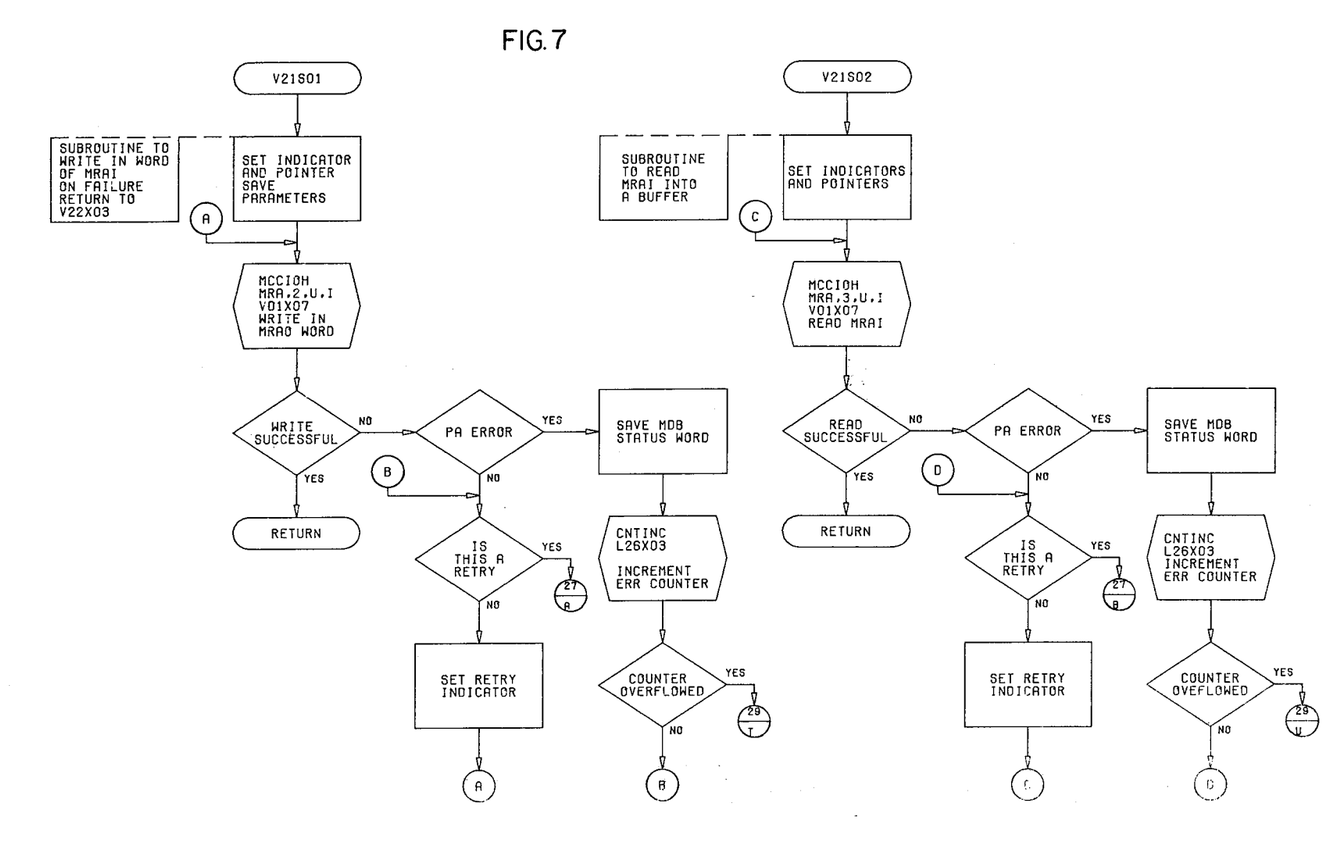
Figure 8:
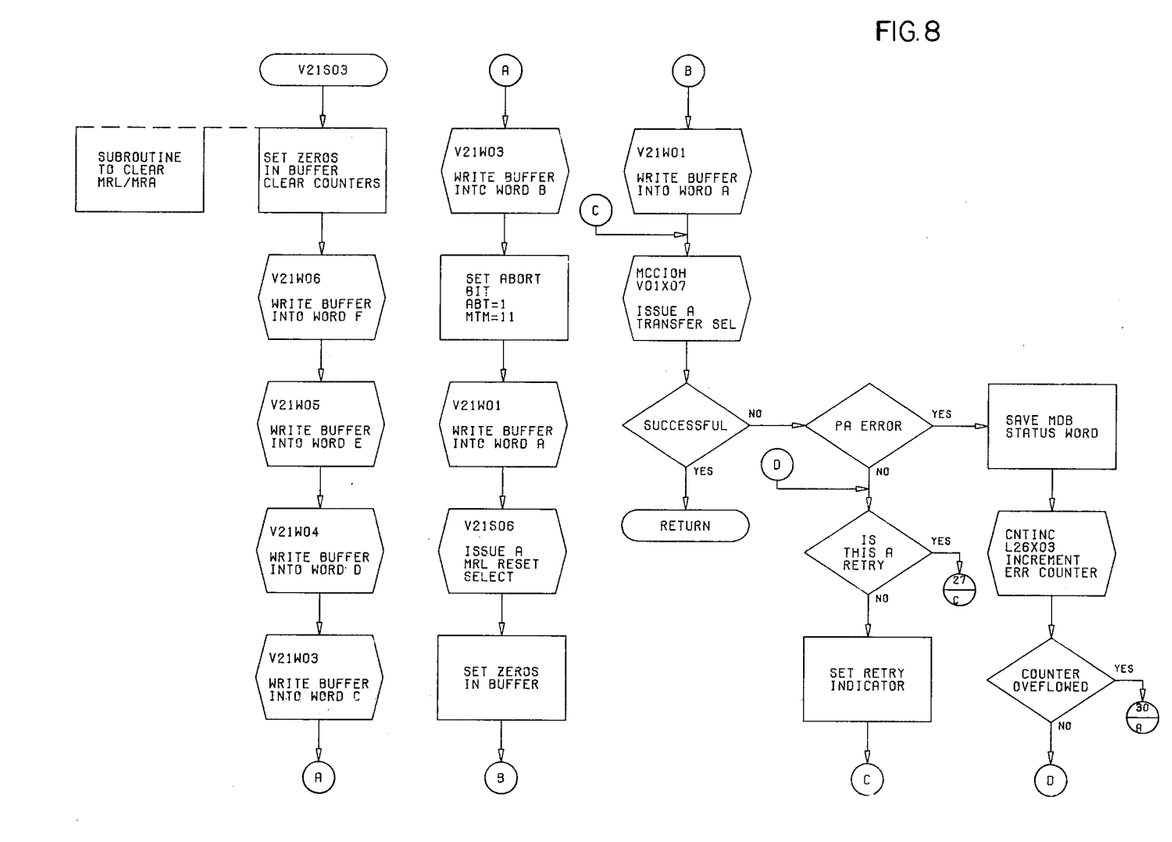
Figure 9:
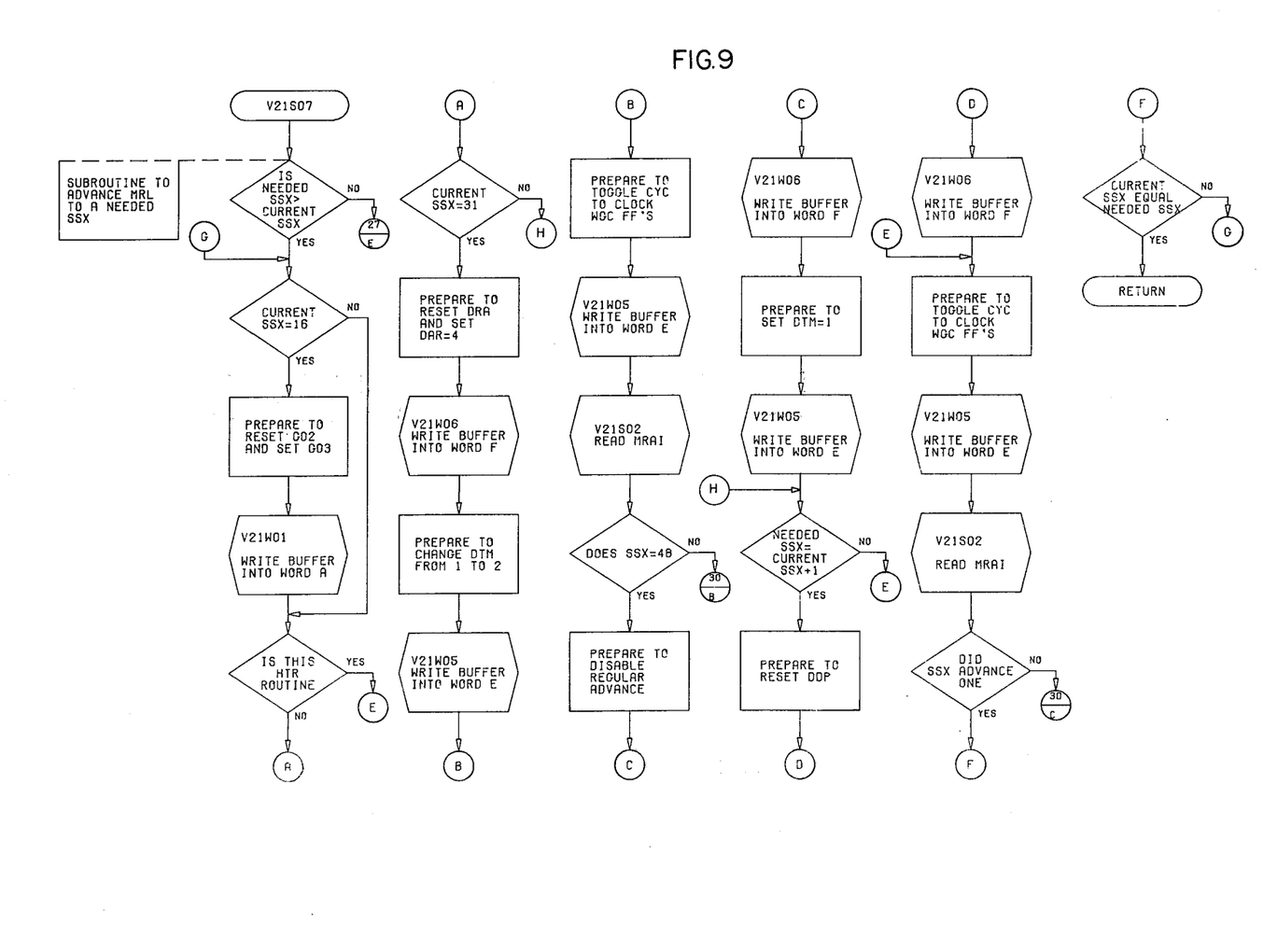

Several subroutines are called by the program, and for sake of clarity as shown in FIG. 3 the only one illustrated in detail is SSXADV. The following is a list of the subroutines and their functions:

a. MRLCLR same as V21503; FIG. 8: clears down the MRA/MRL by writing all zeros into all words of the MRAO register, issuing a MRL reset directive (resets all latches and flip flops in the MRL), and then clearing out the MRAI register by transferring all zeros from the MRAO to MRAI registers.

b. MRAWWA, WWE, WWF (same as V21W01, W05, W06; FIG. 6): writes into one of the three words (A, E, or F) of the MRAO register. Each of these subroutines call V21501 (FIG. 7) which interfaces with the MCC I/O handler to perform the actual I/O operations to the MRL30 via the MRA21 circuit.

c. MRARD (same as V21502; FIG. 7): interfaces with the MCC I/O handler to read all six words of the MRAI register into a buffer in the computer main memory 13.

d. SSXADV (same as V21507; FIG. 9): used to advance the MRL into a particular sequence state (SSX).

Figure 11:
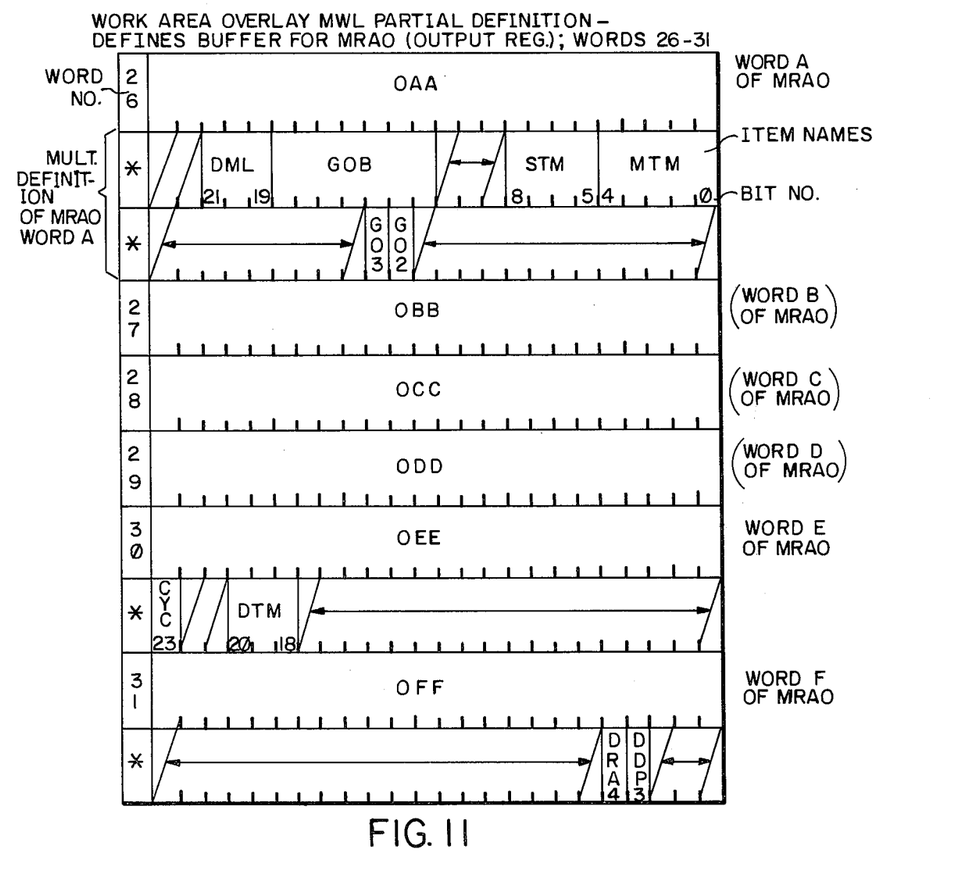
Figure 12:
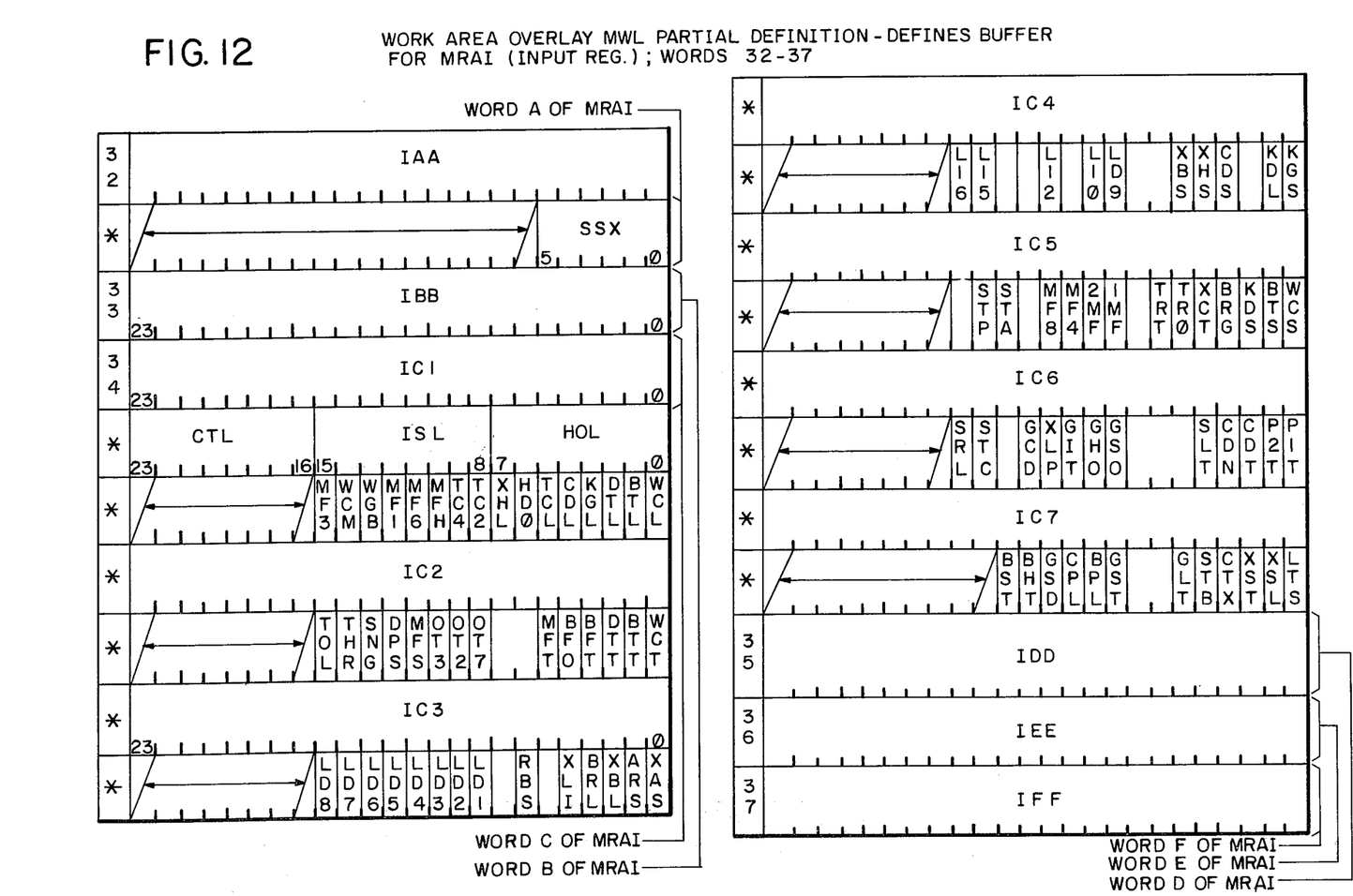

For the I/O subroutines, two six word buffers in the work area (overlay MWL) are used. FIG. 11 shows the overlay for writing to the MRAO register (subroutines MRAWWA, E, F). Only those items pertinent to the present invention are shown. FIG. 12 shows the overlay for reading the MRAI register (subroutine MRARD). Whenever MRARD is called, all six words of the MRAI are read into MWL (words 32–37); however only words A and C are interrogated by the program.

V21. This example requires the following initialization of table VLC:

| WORD NO. | VALUE (OCTAL) | H - HEADER<br>EV - EXPECTED VALUE | COMMENTS |
|---|---|---|---|
| 0 | 04030001 | H | SSX=4, CW3=1, CW4=1, MTM=1 |
| 1 | 00000001 | EV | XAS=1 for CW3 |
| 2 | 00000040 | EV | XBS=1 for CW4 |
| 3 | 21030001 | H | SSX=17, CW3=1, CW4=1, MTM=1 |
| 4 | 00000001 | EV | XAS still=1 (CW3) |
| 5 | 00000000 | EV | XBS=0 (CW4) |
| 6 | 04020101 | H | SSX=4, CW3=1, STM=2, MTM=1 |
| 7 | 00000001 | EV | XAS=1 |
| 8 | 21020101 | H | SSX=17, CW3=1, STM=2, MTM=1 |
| 9 | 00000000 | EV | XAS=0 |
| 10 | 05020012 | H | SSX=5, CW3=1, MTM=10 |
| 11 | 00000001 | EV | XAS=1 |
| 12 | 77777777 | End of table | (entry = 1) |

SYSTEM OPERATION

The detailed operation of the program, including its interaction with the MRL hardware, will now be described by means of an example. Referring to FIG. 1, there is shown two typical output latches XAS and XBS which are set and reset during various sequence states during the running of a system ATS routine. The status of both latches can be monitored via the diagnostic multiplex 36. Latch XAS, gates 185 and 186, is associated with row 2, bit 0 of the multiplex, and latch XBS, gates 187 and 188, is associated with row 4, bit 5. Both of these are shown in FIG. 12 (under words IC3 and IC4 respectively). The set and reset conditions for this example are:

| MTM | STM | SSX | COMBINING LOGIC GATE No. | OPERATION |
|---|---|---|---|---|
| 1 | 0 | 4 | 181 | Set XAS, Set XBS |
| 1 | 0 | 17 | 182 | Reset XBS |
| 1 | 2 | 17 | 183 | Reset XAS |
| 10 | 0 | 5 | 184 | Set XAS |

For those cases with the STM=0, the corresponding action occurs for STM; thus for MTM=1, STM=1 both latches XAS and XBS are set in SSX 4, but only latch XBS is reset in SSX 17. And for STM=2, both are set in SSX 4 and reset in SSX 17. Any latches that remain up at the end of a test (for example, the case above: MTM=1, STM=1; latch XAS remains set after SSX 17) are reset at the end of a normal routine via a common end sequence (via a momentary ground on lead END RST in FIG. 1). These reset conditions do not have to be checked by the program being described, since part of the end sequence makes a check that all output latches have reset. This is done in the hardware by OR'- ing together all of the latches (not shown in FIG. 1), and is part of the UPCHK/DNCHK operation as described in U.S. Pat. No. 3,812,237, issued May 21, 1974.

Figure 10:
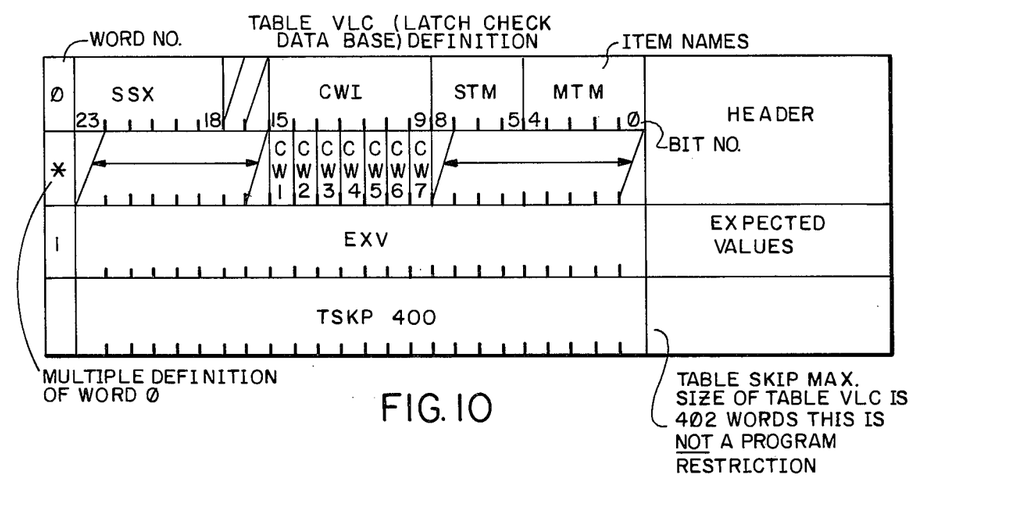
FIGS. 10–12 are charts illustrating the program table information used in controlling the apparatus of the present invention.

In order to check the set/reset conditions of the latches in this example, the data base must be defined with appropriate values. FIG. 10 defines the items in table VLC (latch check data base), which are used by Note that for MTM = 1 and STM = 0, a check can be made in state SSX 17 that latch XAS does not reset (word 4 above). This verifies that the STM 2 lead is not open at gate 182, covering latch XAS to be reset for all STM's. This check need not be explicitly performed in state SSX 17 as shown, if other latches in C-word row 3 (IC3) are being examined at state SSX 17 or greater for MTM = 1, STM = 0 since due to the propagation mentioned earlier the set condition of XAS would be verified at that time. This would be an example of the minimization of the data base which was earlier mentioned.

For MTM = 1, STM = 2, the setting of XAS in SSX 4 is again verified so the check for XAS = 0 in SSX 17 will be valid (word 9). The final entry (words 10–11) was included to check the second MTM in the example.

Referring to the general flow chart (FIG. 2), the latch test is begun by setting the data base pointer (DBP) to 0 in block 901. It then points to the header word of the first entry in the initialization of VLC (data base). The MRA/MRL hardware is then cleared down (MRCLR), block 902. As previously described, this clears out the MRAO and MRAI registers, and resets all latches in the MRL. The following items are then initialized in the MRAO, in blocks 903 and 904: G02 = 1 and DTM = 1. This is in preparation of using the walking gray code WGC sequence state counter in a special diagnostic test mode DTM so as to advance to a particular sequence state independently of the regular advance logic.

The header word of the data base entry specified by DBP is saved in block 905. In the present case the first header word is octal 04030001. The MTM and STM information as specified in the header (MTM = 1, STM = 0) are written into word A of the MRAO (block 906). It is important to note that this "write" operation is done such that the previous contents of word A (in this case G02 = 1) are preserved for fields not specified and that since STM is specified, zeros are written in that field. In block 907, DRA = 1, and DDP = 1 are written into word F. As mentioned above, setting DRA disables the inputs from the regular advance logic (via a ground on DRA, FIG. 1) to avoid interaction. Setting DDP disables the regular distributing pulse output logic circuits, which are generated for each sequence state advance and are used to set or reset latches.

Subroutine SSXADV is then called (block 908) to advance the MRL unit from SSX 0 to the SSX specified in the header word (SSX 4). SSXADV (FIG. 3) first checks if the present SSX is 16 (block 1001), in which case it would reset G02 and set G03 in preparation for shifting in 0's into FF0 to advance through SSX's 17-0 as previously described. It then checks if the requested SSX is only one more than the current SSX (block 1003). If so, this means that the next SSX advance is the one which is to set or reset a latch to be checked by the program. It then resets bit DDP, block 1004, allowing a pulse to be outputted on the DP1 OUT lead of AND gate 170 after the next sequence state advance. If the next SSX does not equal the current SSX plus 1, it bypasses block 1004 leaving DDP = 1 (since it was set in block 907 of the main program). Therefore, for all SSX transitions except the last, DP1 OUT is inhibited. This insures that only the latches to be checked in a particular SSX will be set or reset as desired, and no other latches are set or reset in intermediate SSX states between two consecutive data base entries. The CYC bit in word E of the MRAO reigster is then toggled to cause the SSX counter 115 to advance one sequence state.

SSXADV then reads the SSX in block 1007, and verifies that it did advance by one. If not, a trouble report is outputted. Otherwise a check is made if it is done, requested SSX = current SSX?, in block 1008, and if not, the subroutine loops back to block 1001 to advance one more SSX. If they do compare, SSXADV returns to the main program.

Now that the MRL has been advanced to the SSX specified in the header word, the appropriate latch (es) should have been set or reset during the last SSX advance via one or more of the "AND" gates in the combining logic being enabled, which is a combination of MTM, STM, SSX, and DP1 OUT true. It is now time to check if the proper latches were set or reset by comparing them to the expected results. The data base pointer DPB is incremented block 909, which makes it point to the first data word following the header (in this case, word 1, = 00000001 which is set for XAS = 1). The C-word index (CWI) field of the header word (previously saved) is then interrogated, and a DML (diagnostic multiplex) value is set up based on the first C-word bit found set (from left to right). In this case, CW3 is the first one found, so DML = 3 is written into word A of the MRAO (block 910). This gates the status of up to 24 latches in row 3 of the diagnostic multiplex to word C of the MRAI, only gate 191 of FIG. 1 is shown. All six words of the MRAI are then read (block 911). Word C should contain 00000001 (in bits 0–15) since latch XAS should be set and no latches were set in intermediate SSX's. This masked value of word C is compared to the expected results word pointed to by DBP. If they do not compare, a trouble report is outputted on the teletypewriter giving the MTM, STM, SSX, DML value, which is the row number, and the bit number of the first miscompare, right to left.

If the word read and the expected results word do compare, a check is made (block 913) if any other multiplex words are to be examined (are any additional C-word index bits set?. In this example there is another word (CW4 = 1), so a branch is taken back to block 909 where the DBP is incremented, which now points to word 2. The same process is repeated, this time writing DML = 4 and checking that latch XBS was set. The next time through block 913 the answer is no; therefore the DBP is incremented again (block 914) so that it points to the first word (header) of the next entry. As mentioned in the overview, a provision is made to ignore header words of 0 to allow easy deletion of entries from the data base. This check is made in block 915.

In this example the next header word (word 3) is not 0 (and also not=1), so the program falls through to block 917. The new MTM, from the header word pointed to by DBP, and is compared to the previous MTM (in the header word saved in block 905). If they are not equal, a branch is taken back to block 902, to clear down the MRL hardware so as to start from SSX 0 in the new MTM. If they are equal, the new SSX is checked to see if it is greater than the previous SSX. If not, the same branch is taken back to 902 to start at SSX 0 again, since subroutine SSXADV can only advance SSX's, and always must advance at least one. If the new SSX is greater than the previous, a branch is instead taken to block 905, where the current header word is saved. The same MTM and possibly a different STM is written in block 906, and the MRL is advanced to the new SSX.

In this example, since the header (21030001) specifies the same MTM, and the new SSX (17) is greater than the previous (4) the MRL is advanced to the new SSX. In SSX 17 latch XAS is checked that it is still set (gate 182 should not have been enabled for STM ≠ 2). Latch XBS is checked that it was reset. In the next header word (word 6), though it specifies the same MTM, the SSX (4) is less than 17 (last SSX) so the MRL is cleared down and advanced from SSX 0 to 4. Latch XAS is checked that it sets in SSX 4, and in the next entry, that it resets in SSX 17 (for STM = 2). Note XBS does not need to be checked explicitly for STM 2 (check for STM = 0 was adequate).

The final header word specifies a new MTM, so the MRL is cleared again before advancing to SSX 5 to check XAS. After this check a "header word" = 1 (word 12) is detected, so the latch check terminates (block 916).

What is claimed is:

1. In a system having a sequentially-operated control unit including a group of bi-stable output devices responsive to the outputs of a sequence state counter, a method of in-circuit testing a selected one of the bi-stable devices, comprising:
   advancing the sequence state counter to a sequence state associated with the selected device under test;
   enabling subsequently the selected device under test to be controlled by the output of the counter;
   providing processing means for determining the proper output condition for the selected device under test; and
   selectively gating subsequently the output of the selected bi-stable device under test to said processing means to determine whether or not the device under test is operative.

2. In a system having a sequentially-operated control unit including a group of bi-stable output devices responsive to the outputs of a sequence state counter, an apparatus for incircuit testing a selected one of the bi-stable devices, comprising:
   means for advancing the sequence state counter to a sequence state associated with the selected device under test;
   means for enabling subsequently the selected device under test to be controlled by the output of the counter;
   processing means for determining the proper output condition for the selected device under test; and means for selectively gating subsequently the output of the selected bi-stable device under test to said processing means to determine whether or not the device under test is operative.

* * * * *